UNITED STATES PATENT OFFICE.

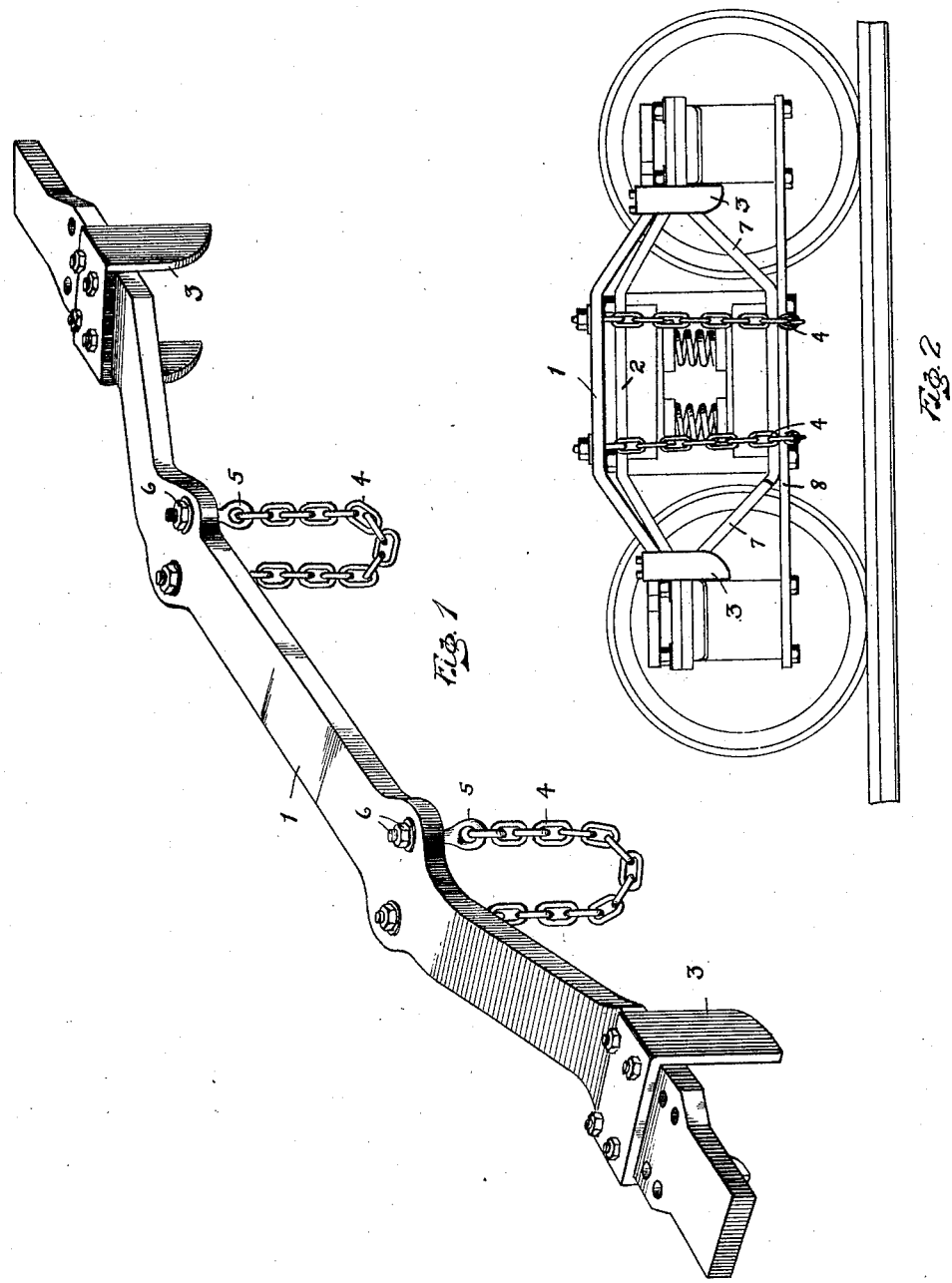

PETER SWANSON, OF ELY, MINNESOTA.

AUXILIARY ARCH-BAR.

1,393,716.  Specification of Letters Patent.  Patented Oct. 11, 1921.

Application filed June 9, 1921. Serial No. 476,133.

*To all whom it may concern:*

Be it known that I, PETER SWANSON, a citizen of the United States, residing at Ely, in the county of St. Louis and State of Minnesota, have invented certain new and useful Improvements in Auxiliary Arch-Bars, of which the following is a specification, reference being had therein to the accompanying drawing.

This invention relates to arch bars for railway cars.

The principal object of the invention is to produce an auxiliary arch bar which may be used in the event of an emergency, as for example when a portion of the truck may have become broken and it otherwise would be impractical to operate the car.

It is well known to those versed in the art of railroading how frequently the sway bar of a truck becomes broken, thus rendering the truck of the car practically inoperative and when this occurs on a loaded car or one that is remote from a repair shop it is very desirable to operate the car until a more convenient time or place for repairs is reached, and in which event my improved auxiliary arch bar would obviously become of great service.

Other objects and advantages of the peculiar structure will appear in the further description of the invention.

Referring to the accompanying drawing forming part of this application in which like reference characters indicate like parts:

Figure 1 is a perspective view of one of the improved arch bars, and

Fig. 2 is a side elevation of a car truck with the arch bar applied thereto, the sway bar being shown as cracked or broken.

1 represents the auxiliary bar which is in form very similar to the ordinary arch bar 2 of a car truck except that it is shaped to fit on top of the nuts or bolt head of the standard arch bar of the truck. The auxiliary bar has attached adjacent each end an inverted U-shaped yoke 3 which are securely bolted to the bar from the upper side thereof. These yokes are so positioned upon the bar as to depend just inside of the journal box at each end of the truck when the bar is applied thereto.

Adjacent each termination of the uppermost arched portion of the bar is adjustably suspended a sway chain 4, which is designed to be placed about the fabricated structure of the truck just beneath the bolster thereof and drawn up tightly into place by the eye bolts 5 and the nuts 6 at the ends of the chains.

Thus when any damage occurs to the bolster support at the end of a truck, such for example as the breaking of the sway bar 7 which is quite common, whereby the truck becomes weakened, the auxiliary arch bar may be applied to strengthen same and to compensate for the injury until such time as permanent repairs are possible.

In such application, the auxiliary bar is placed directly on top of the standard bar and the bolts for holding it in place, with the sway chains looped down around the tie rod 8, may be tightly drawn to position by the nuts 6. In this manner the truck may be quickly and conveniently reinforced to continue its journey to a more convenient place of repair, as before stated.

Having thus described my invention, what I claim and desire to secure by Letters Patent is:

1. An auxiliary arch bar of the character described, comprising a main body portion to fit on top of a standard arch bar, means for holding it in position on a truck and depending hold fast means for engagement with portions of the truck beneath the bar for the purpose described.

2. An auxiliary arch bar of the character described, comprising a main arched body portion to fit on top of a standard arch bar, means for holding it in position on a truck and depending hold fast means for engagement with portions of the truck beneath the bar for the purpose described.

3. An arch bar of the type described comprising a main arched body portion, inverted U-shaped members at either end of the bar for straddling the standard arch bar of the truck, adjustable loops of chains suspended from the auxiliary bar for engagement about portions of the truck beneath the bar and means for tightening the chains for the purpose described.

In testimony whereof I hereunto affix my signature in the presence of two witnesses.

PETER SWANSON.

Witnesses:
A. N. NELSON,
EDWARD LYST.